US011934728B2

(12) United States Patent
Ichikawa et al.

(10) Patent No.: US 11,934,728 B2
(45) Date of Patent: Mar. 19, 2024

(54) PRINTING APPARATUS

(71) Applicant: BROTHER KOGYO KABUSHIKI KAISHA, Nagoya (JP)

(72) Inventors: Kazuki Ichikawa, Gamagori (JP); Rui Nakayama, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/192,266

(22) Filed: Mar. 29, 2023

(65) Prior Publication Data

US 2023/0315367 A1 Oct. 5, 2023

(30) Foreign Application Priority Data

Mar. 31, 2022 (JP) ................. 2022-058272

(51) Int. Cl.
G06F 3/12 (2006.01)

(52) U.S. Cl.
CPC .......... G06F 3/1267 (2013.01); G06F 3/1222 (2013.01); G06F 3/1238 (2013.01); G06F 3/1274 (2013.01)

(58) Field of Classification Search
CPC .... G06F 3/1267; G06F 3/1222; G06F 3/1238; G06F 3/1274
USPC ................................ 358/1.15, 1.9
See application file for complete search history.

(56) References Cited

U.S. PATENT DOCUMENTS

| 8,184,309 | B2* | 5/2012 | Koshika | G06F 3/1208 358/1.14 |
| 2006/0256364 | A1 | 11/2006 | Yamamoto | |
| 2015/0242164 | A1 | 8/2015 | Takeuchi | |
| 2016/0210094 | A1 | 7/2016 | Nishikawa | |
| 2019/0138257 | A1* | 5/2019 | Kubota | G06F 3/1274 |

FOREIGN PATENT DOCUMENTS

| JP | 2004098413 A | 4/2004 |
| JP | 2006341591 A | 12/2006 |
| JP | 2015160379 A | 9/2015 |
| JP | 2016137583 A | 8/2016 |

* cited by examiner

Primary Examiner — Quang N Vo
(74) Attorney, Agent, or Firm — Scully, Scott, Murphy & Presser, PC

(57) ABSTRACT

Printing apparatus includes a controller is configured to executes holding selection processing of allowing holding in a storage device or deletion from the storage device of a storage of a print job selected by a print job selection processing to be selected by a user's input operation received via the user interface. The print job for which holding of the storage of the print job is selected is stored in the storage device in association with a holding flag. When the holding flag is associated with the print job stored in the storage device, the print job is not deleted from the storage device at a predetermined automatic deletion timing. When the holding flag is not associated with the print job stored in the storage device, the print job is deleted from the storage device at the automatic deletion timing.

7 Claims, 10 Drawing Sheets

FIG. 4A

| JOB NAME | RECEPTION DATE AND TIME | | USER IDENTIFICATION INFORMATION | HOLDING FLAG |
|---|---|---|---|---|
| PRINT JOB 1 | 2022/3/11 | 10:00 | UserA | OFF |
| PRINT JOB 2 | 2022/3/11 | 10:10 | UserA | OFF |
| PRINT JOB 3 | 2022/3/11 | 10:50 | UserA | OFF |
| PRINT JOB 4 | 2022/3/11 | 10:52 | UserA | OFF |
| PRINT JOB 5 | 2022/3/11 | 10:53 | UserA | OFF |
| PRINT JOB 6 | 2022/3/11 | 12:00 | UserB | OFF |

FIG. 4B

| JOB NAME | RECEPTION DATE AND TIME | | USER IDENTIFICATION INFORMATION | HOLDING FLAG |
|---|---|---|---|---|
| PRINT JOB 1 | 2022/3/11 | 10:00 | UserA | ON |
| PRINT JOB 2 | 2022/3/11 | 10:10 | UserA | OFF |
| PRINT JOB 3 | 2022/3/11 | 10:50 | UserA | ON |
| PRINT JOB 4 | 2022/3/11 | 10:52 | UserA | OFF |
| PRINT JOB 5 | 2022/3/11 | 10:53 | UserA | OFF |
| PRINT JOB 6 | 2022/3/11 | 12:00 | UserB | OFF |

PRINTING APPARATUS

REFERENCE TO RELATED APPLICATIONS

This application claims priority from Japanese Patent Application No. 2022-058272 filed on Mar. 31, 2022. The entire content of the priority application is incorporated herein by reference.

BACKGROUND ART

In the printing apparatus according to a first related art, a print job to which authentication information is assigned is stored in a print job storage device, an input of a password from a user is received, and when there is a print job having a matching password, the print job is printed. In the printing apparatus according to the first related art, after input of the password and before printing, a selection screen is displayed on which a user can select whether to store print data in the storage device after printing or to delete all print data from the storage device after printing, and the user is allowed to select whether to store the print job having a matching password in the print job storage device even after printing. In the printing apparatus according to a second related art, storage time, which is time during which a print job is stored, is set, and a print job stored over the storage time can be automatically deleted.

In a case of implementing printing apparatus in which a function of the printing apparatus according to the first related art and a function of the printing apparatus according to the second related art are combined, there are the following problems. As in the printing apparatus according to the first related art, when a user can select whether to maintain storage of the print data in the storage device after the printing apparatus prints the print data or to delete the printed print data from the storage device after the printing apparatus prints the print data, the print data may be deleted from the storage device at a preset automatic job deletion timing even when the user selects to store the print data.

DESCRIPTION

An aspect of the present disclosure provides printing apparatus in which when storage of a print job in a storage device is selected after printing, the print job is not automatically deleted by a function of automatically deleting a print job.

According to an aspect of the present disclosure, printing apparatus includes a user interface configured to receive an input operation from a user, a display, a printing device configured to print an image on a sheet, a storage device configured to store a print job, and a controller. The controller is configured to execute print job display processing of displaying a print job stored in the storage device on the display, print job selection processing of selecting one or more print jobs among the print jobs displayed by the print job display processing by the input operation received via the user interface, holding selection processing of displaying a selection screen for selecting whether storage of the print job selected by the print job selection processing is to be held in the storage device or deleted from the storage device after completion of printing, and allowing holding or deletion of the storage of the print job to be selected by the input operation received via the user interface, print processing of printing an image based on the print job selected by the print job selection processing on a sheet using the printing device, and deletion processing of holding storage of the print job for which the print processing is completed in the storage device when holding of the storage of the print job is selected by the holding selection processing, and deleting the storage of the print job for which the print processing is completed from the storage device when deletion of the storage of the print job is selected by the holding selection processing. The print job for which holding of the storage of the print job is selected by the holding selection processing is stored in the storage device in association with a holding flag. When the holding flag is associated with the print job stored in the storage device, the print job is not deleted from the storage device at a predetermined automatic deletion timing. When the holding flag is not associated with the print job stored in the storage device, the print job is deleted from the storage device at the automatic deletion timing.

According to the above configuration, when a user selects to hold storage of a print job after the printing apparatus prints the print job, a holding flag of "ON" is stored in association with the print job. At a timing of deleting a print job from the storage device, the print job stored in association with the holding flag of "ON" is not deleted from the storage device, whereby the print job for which storage is held after printing can be prevented from being automatically deleted by a function of automatically deleting a print job.

In the printing apparatus according to an aspect of the present disclosure, the automatic deletion timing is predetermined periodic time, and the controller is configured to determine whether the holding flag is associated with a print job stored in the storage device at the automatic deletion timing.

According to the above configuration, a print job not associated with a holding information flag is periodically deleted. Therefore, it is possible to prevent a storage capacity of the storage device from being constricted by an unnecessary print job.

In the printing apparatus according to an aspect of the present disclosure, when it is determined that the print job is stored in the storage device in association with the holding flag, the controller is configured to delete the holding flag associated with the print job at the automatic deletion timing.

According to the above configuration, when the print job stored in the storage device is periodically deleted, as for a print job associated with a holding flag, the holding flag associated with the print job is deleted without deleting the print job. Therefore, it is possible to delete a print job that has not been printed for a long period of time by a user, and it is possible to prevent the storage capacity of the storage device from being constricted by an unnecessary print job. Since if a holding flag is associated by the user before the next deletion timing, the print job is not deleted, the user can store a desired print job.

In the printing apparatus according to an aspect of the present disclosure, the controller is configured to determine whether the holding flag is associated with the print job stored in the storage device every time predetermined time elapses, not delete the print job determined to be associated with the holding flag from the storage device, and delete the print job from the storage device when it is determined that the holding flag is not associated and an automatic deletion time elapses from date and time stored in the storage device.

According to the above configuration, a print job not associated with a holding flag is deleted based on the elapsed time from the date and time when the print job is stored in the storage device. There is a high probability that a print job stored in the past is more unnecessary than a newly stored print job. Therefore, it is possible to effectively reduce the usage of the storage capacity of the storage device.

The printing apparatus according to an aspect of the present disclosure further includes a communication device configured to communicate with an external device, in which the controller is configured to receive a print job from the external device via the communication device and store the received print job in the storage device, display, on the display, a job selection screen including a print job list which is a list of the print jobs stored in the storage device in the print job display processing, and select one or more print jobs from the print job list by the use's input operation on the user interface in the print job selection processing.

According to the above configuration, the printing apparatus receives a print job from the external device and stores the print job in the storage device. Then, a list of the print jobs stored in the storage device is displayed on the display of the printing apparatus. When the print processing is performed, the list of the print jobs stored in the storage device is presented to the user, whereby it is possible to allow the user to confirm a storage state of the print jobs in the storage device.

In the printing apparatus according to an aspect of the present disclosure, the controller is configured to execute the holding selection processing after the print job selection processing is executed and before the print processing is executed.

According to the above configuration, the holding selection processing is executed after a print job is selected and before the print processing is executed. Therefore, it is possible to allow the user to confirm whether to hold the print job in the storage device. In addition, when a flag of a print job that the user desires to hold is deleted, it is possible to give an opportunity to reset the flag.

In the printing apparatus according to an aspect of the present disclosure, user identification information related to a user who stores a print job is stored in the storage device in association with the print job, and the controller is configured to further execute authentication processing of receiving an input operation of logging into the printing apparatus via the user interface and performing user authentication based on the user identification information input by the input operation, and display, on the display, a print job stored in association with the user identification information of the user authenticated by the authentication processing among the print jobs stored in the storage device in the print job display processing.

According to the above configuration, the authentication processing is executed, and only a print job of an authenticated user is displayed in the print job display processing. Therefore, only the print job stored by the user can be confirmed from among the print jobs stored in the storage device.

FIGS. 4A and 4B are each a diagram showing an example of job management information.

FIRST EMBODIMENT

<Schematic Configuration of Multi-Function Peripheral>

Figure 1:
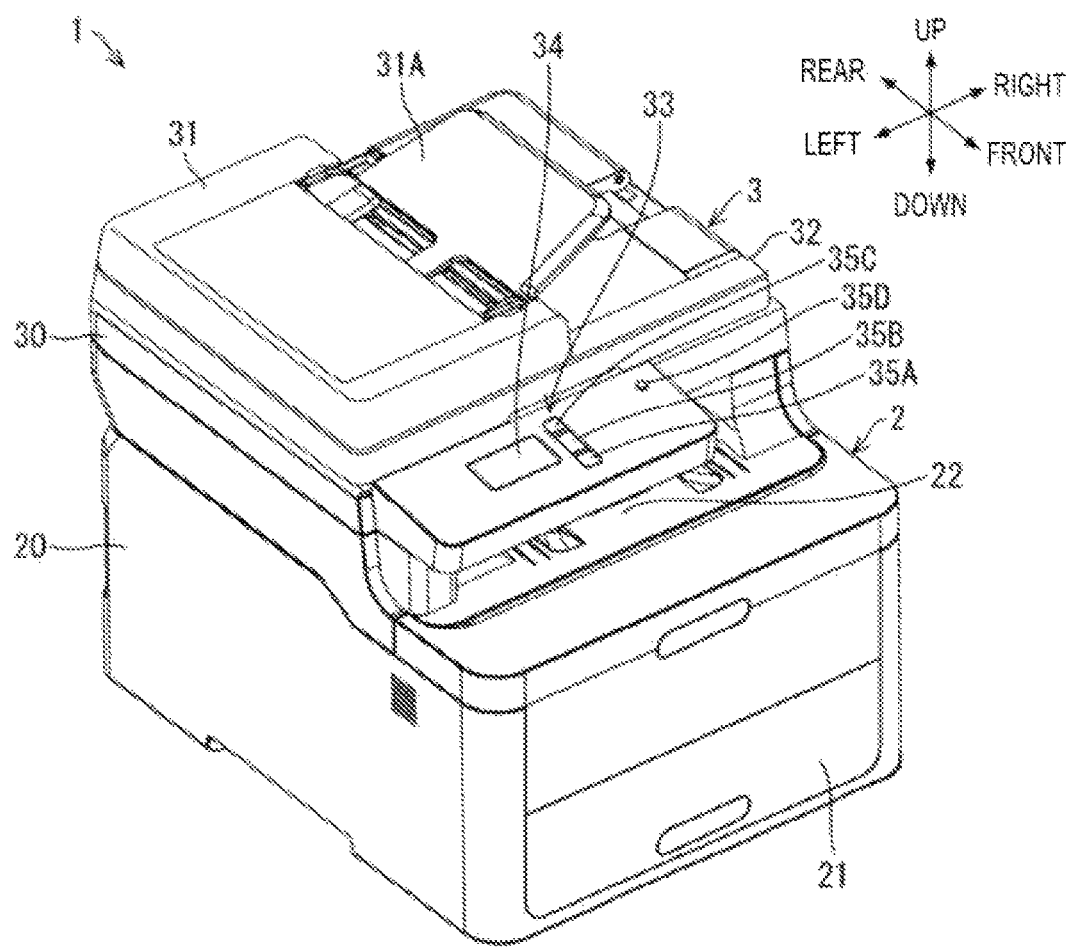
FIG. 1 is a diagram showing an appearance of printing apparatus.

FIG. 1 is a perspective view showing an appearance of a printing apparatus according to a first embodiment of the present disclosure. A multi-function peripheral (MFP) 1 shown in FIG. 1 is an example of the printing apparatus, and has a print function, a copy function, a scan function, a fax function, and the like. The printing apparatus is not limited to a multi-function peripheral having all of the functions described above, and may be, for example, a multi-function peripheral not having a fax function. Hereinafter, as indicated by arrows in FIG. 1, an upper-lower direction, a front-rear direction, and a left-right direction of the multi-function peripheral 1 are defined.

The multi-function peripheral 1 includes a printing device 2, an image reading device 3, an operation panel 33, and a touch panel 34. The printing device 2 has an electrophotographic print function. A printing method of the printing device 2 is not limited to an electrophotographic method, and may be an inkjet method. A housing 20 of the printing device 2 includes a feed tray 21 and a discharge tray 22. The feed tray 21 can accommodate a plurality of sheets such as plain paper. The printing device 2 prints an image on a sheet fed from the feed tray 21, and discharges the sheet to the discharge tray 22. The sheet accommodated in the feed tray 21 is not limited to plain paper, and may be cardboard or the like.

The image reading device 3 has a scan function to read an image on a document and generate image data representing a read image.

The image reading device 3 includes a housing 30, a document conveying device 31, and a document cover 32. The document conveying device 31 includes a document tray 31A on which a plurality of documents can be stacked. The document cover 32 is provided so as to be rotatable with respect to a mounting table of the housing 30. The image reading device 3 is configured to read the image on the document using FB (frat head) method or ADF (automatic document feeder) method. When the document is scanned using the FB method, the document cover 32 is closed to a close position after the document cover 32 is opened to an open position and the document is placed on a top surface of a contact glass.

The operation panel 33 and the touch panel 34 are provided on a front surface of the multi-function peripheral 1. The operation panel 33 includes the touch panel 34, a cancel key 35A, a home key 35B, a return key 35C, a power key 35D, and the like.

Figure 2:
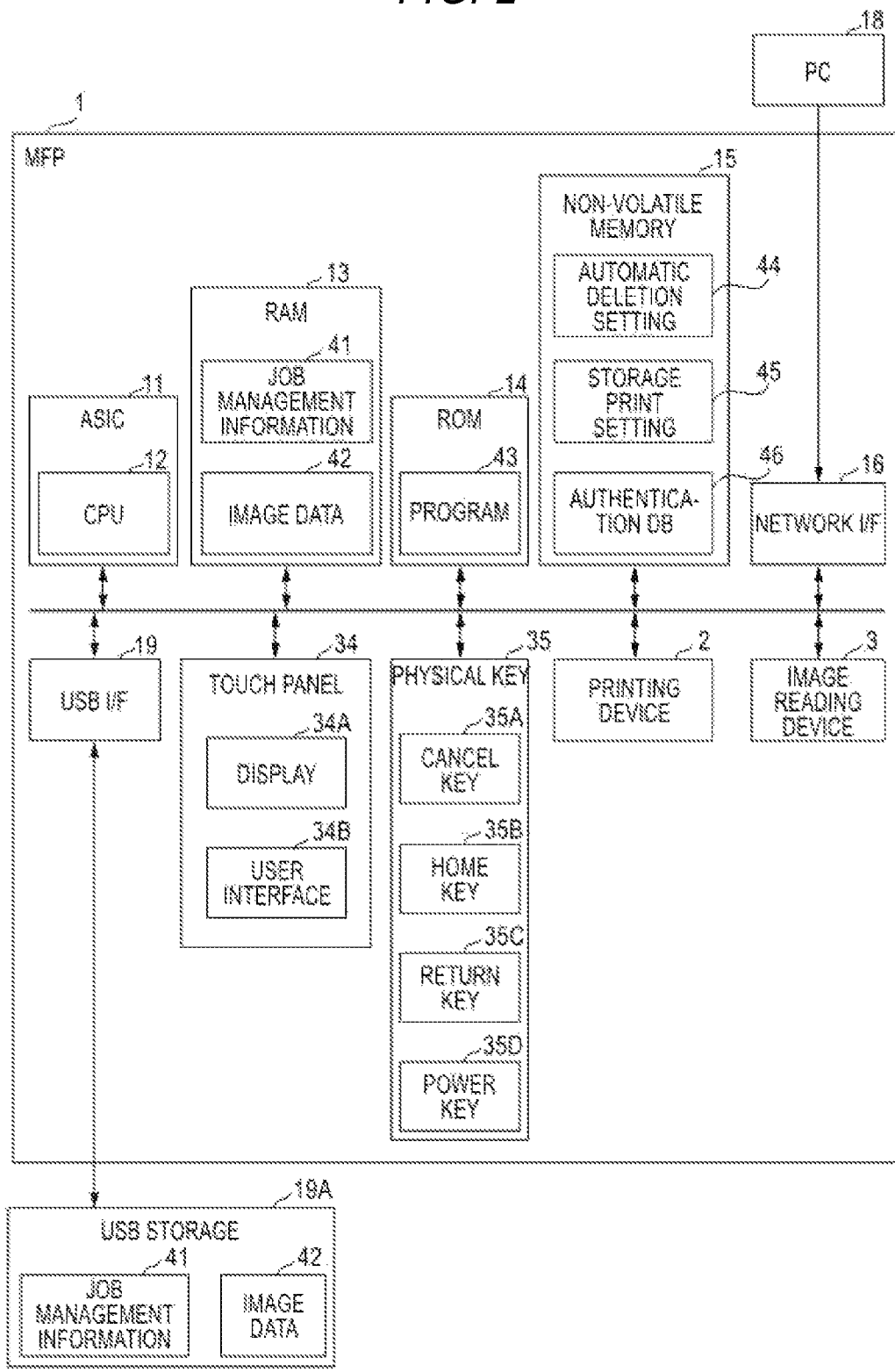
FIG. 2 is a block diagram showing an electrical configuration of the printing apparatus according to the first embodiment of the present disclosure.

FIG. 2 is a block diagram showing an electrical configuration of the multi-function peripheral 1. The multi-function peripheral 1 includes the printing device 2, the image reading device 3, an ASIC 11, a RAM 13, a ROM 14, a non-volatile memory 15, a network I/F 16, and a USB I/F 19.

The ASIC 11 is mounted with a CPU 12. The CPU 12 is an example of a controller, and performs an overall control of the devices of the multi-function peripheral 1. The ASIC 11 may be used as the controller. The ROM 14 stores a program 43 for controlling the multi-function peripheral 1. The CPU 12 executes the program 43 using the RAM 13 as a work area. The non-volatile memory 15 includes an NVRAM or the like, and stores settings of various processing of the multi-function peripheral 1 and data used for the various processing.

The network I/F 16 is an example of a communication device. The multi-function peripheral 1 is connected to the LAN via the network I/F 16 and communicates with a PC 18. The PC 18 is an example of an external device, and is an information terminal operated by a user other than an administrator. The network I/F 16 may be connected to a network other than the LAN. The external device may be an information terminal other than a personal computer, and may be, for example, a smartphone, a tablet terminal, or the like. The multi-function peripheral 1 is connected to a USB storage 19A from the outside of the multi-function peripheral 1 via the USB I/F 19.

The touch panel 34 includes a display 34A and a user interface 34B. The display 34A of the touch panel 34 is an example of a display, and includes a liquid crystal display or the like. An operation screen or the like of the multi-function peripheral 1 is displayed on the display 34A. The user interface 34B receives a touch operation by the user and detects a position pressed by the user. A liquid crystal display that does not include the user interface 34B may be used as the display. A physical key 35 is an example of a user interface, and receives an input operation by the user.

The USB storage 19A is an example of a storage device, and stores a print job. The print job includes at least image data 42, and can be added with user identification information and a job name. The USB storage 19A is stored with job management information 41, and is stored with information on a print job to which user identification information and a job name are added. The RAM 13 may be used as the storage device, and the job management information 41 and the image data 42 of the print job may be stored in the RAM 13.

<Storage of Print Job>

Figure 3:
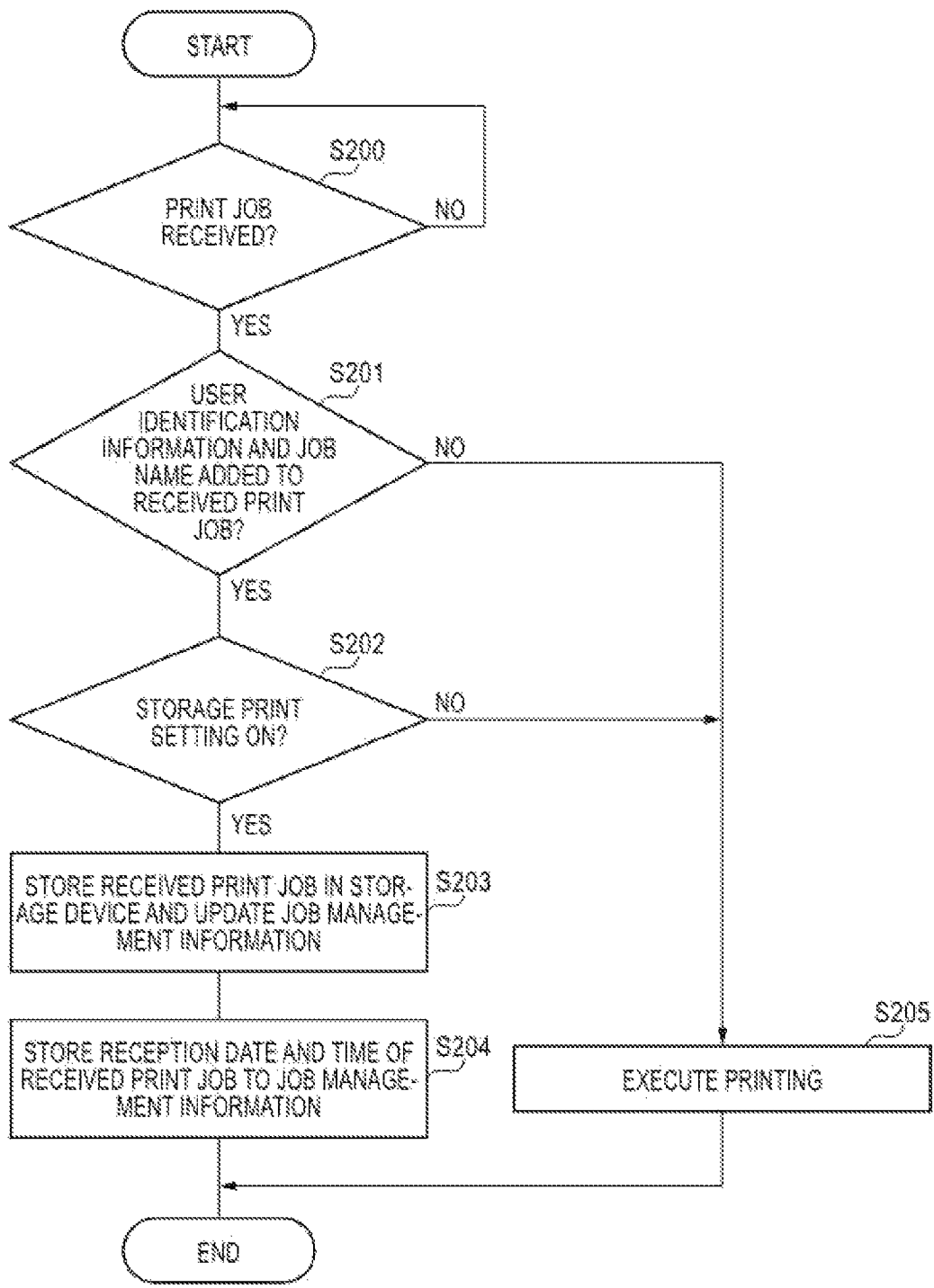
FIG. 3 is a flowchart relating to processing of storing a print job in a storage device.

FIG. 3 is a flowchart of processing of storing a print job in the storage device such as the USB storage 19A. In the following description, it is assumed that a print job is stored in the USB storage 19A.

When a print job is received from the PC 18 via the network I/F 16 (S200: YES), the CPU 12 determines whether user identification information and a job name are added to the received print job (S201).

In step S201, when user identification information and a job name are added to the print job (S201: YES), the CPU 12 proceeds to the processing of step S202, and when user identification information and a job name are not added to the print job (S201: NO), the CPU 12 proceeds to the processing of step S205.

In step S202, the CPU 12 determines whether storage print setting 45 stored in the non-volatile memory 15 is ON. The storage print setting 45 is a setting relating to whether storage print processing to be described in detail later can be executed, and the storage print processing can be executed when the storage print setting 45 is ON. In step S202, when the storage print setting 45 is ON (S202: YES), the CPU 12 proceeds to the processing of step S203, and when the storage print setting 45 is OFF (S202: NO), the CPU 12 proceeds to the processing of step S205.

In step S203, the CPU 12 stores the print job received from the PC 18 in the USB storage 19A. The CPU 12 stores the image data 42 of the print job in the USB storage 19A. Further, the CPU 12 adds the job name and the user identification information that are added to the print job to the job management information 41, and stores the added job management information 41 in the USB storage 19A. In subsequent step S204, the CPU 12 adds reception date and time of the print job to the job management information 41.

When it is determined in step S201 that user identification information and a job name are not added to the print job (S201: NO), or when it is determined in step S202 that the storage print setting 45 is OFF (S202: NO), the CPU 12 performs the processing of step S205. In step S205, the CPU 12 controls the printing device 2 to print the image data 42 of the print job received from the PC 18 on the sheet.

<Job Management Information>

FIG. 4A shows an example of the job management information 41 after the processing of step S204. For a print job of which the image data 42 is stored in the USB storage 19A, a job name and user identification information added to the print job, reception date and time of the print job, and a holding flag are stored in the job management information 41 shown in FIG. 4A. The holding flag is related to automatic deletion processing to be described later, and is set to OFF in an initial state. In the following description, a fact that the holding flag is OFF in the job management information 41 will be described as a fact that the holding flag is not associated with the print job, and a fact that the holding flag is ON will be described as a fact that the holding flag is associated with the print job.

<Storage Print Processing>

Figure 5:
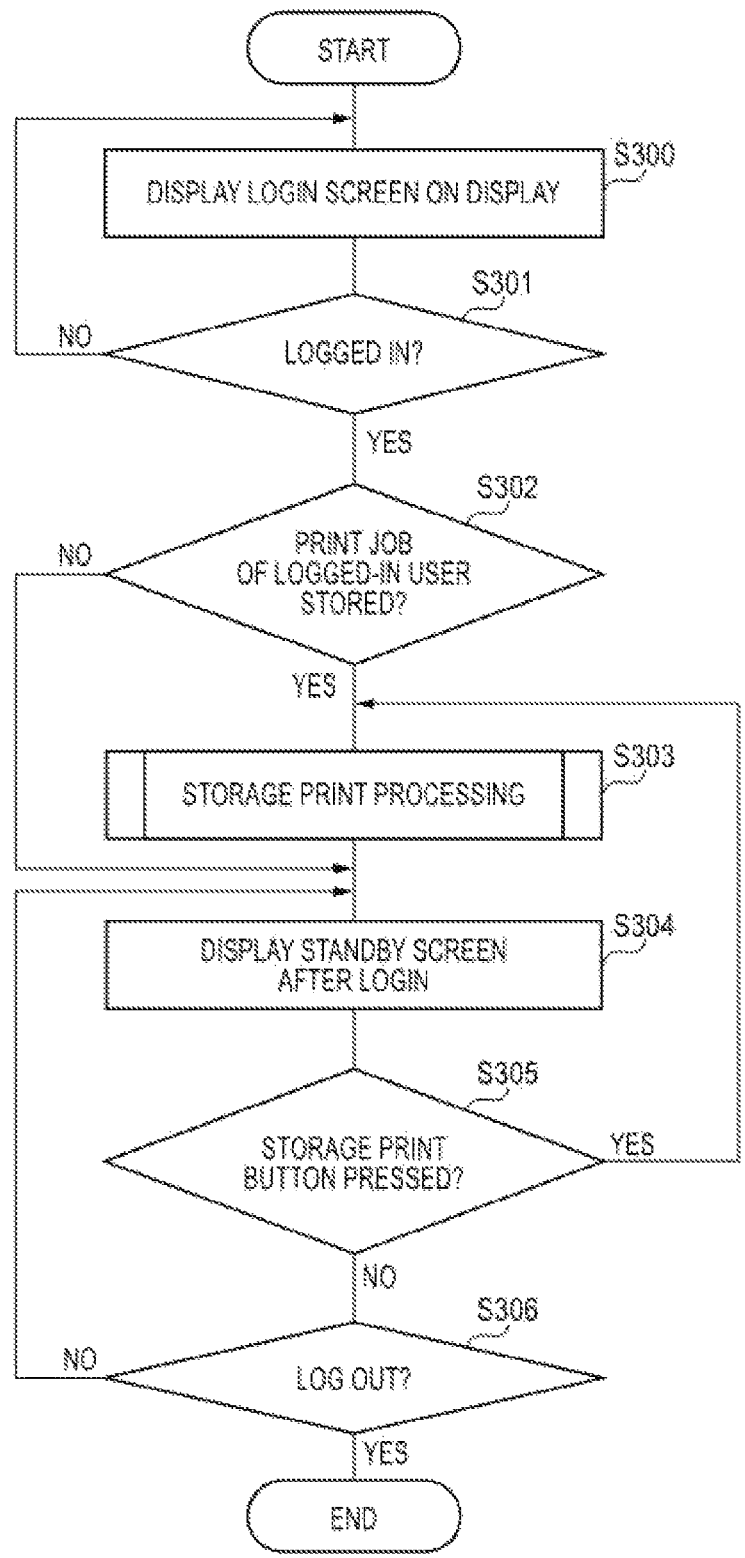
FIG. 5 is a flowchart showing a flow of processing of printing a print job in the printing apparatus according to the first embodiment of the present disclosure.
Figure 6:
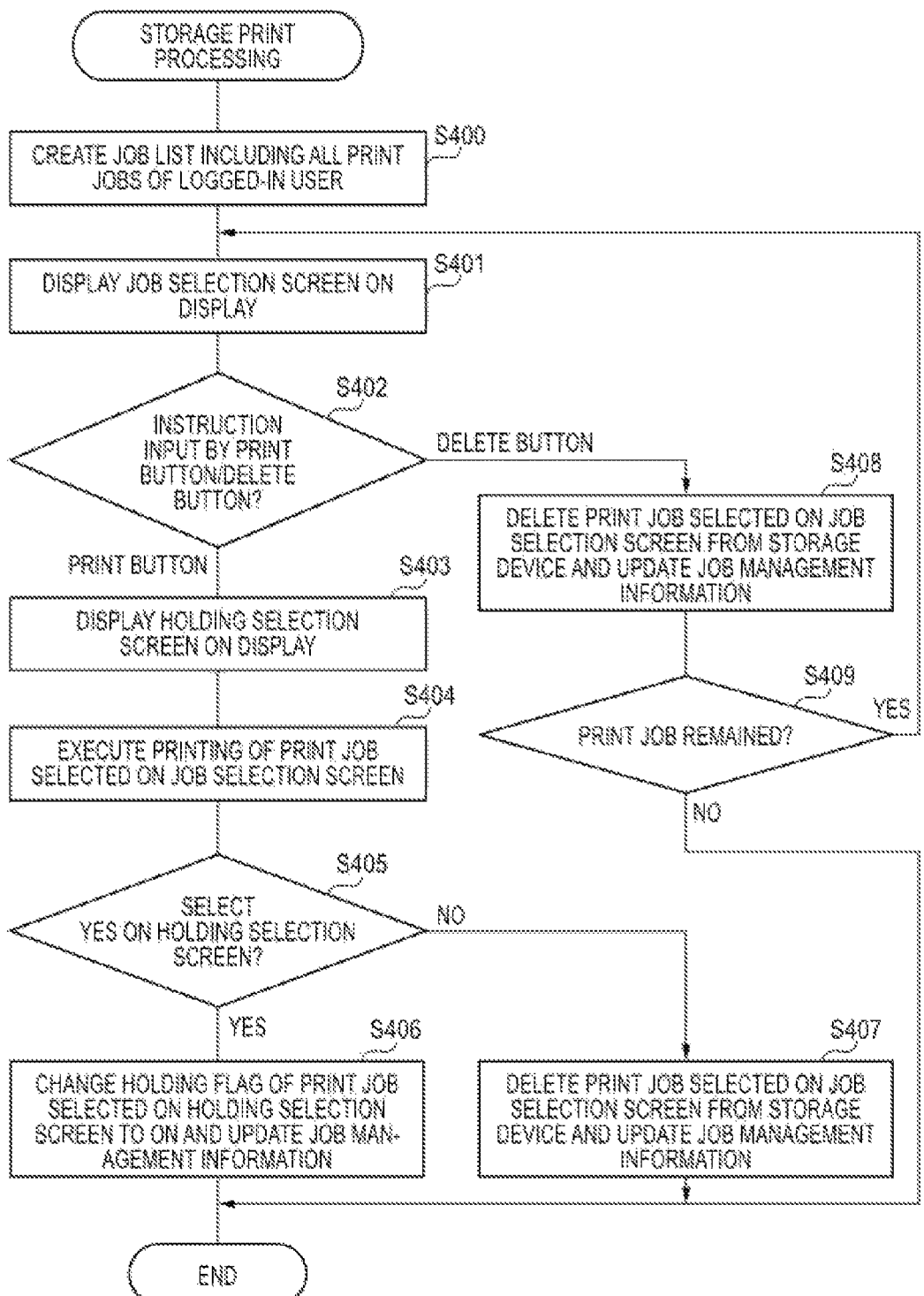
FIG. 6 is a flowchart showing a flow of storage print processing in FIG. 5.
Figure 7A:
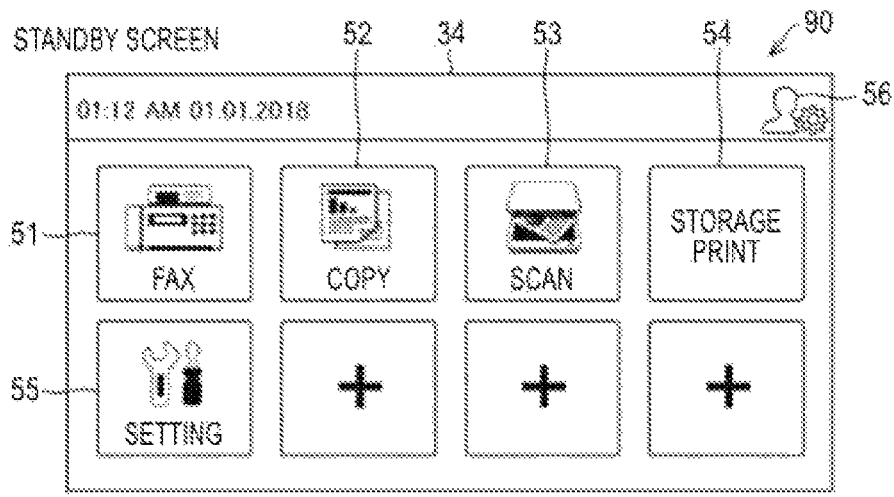
FIG. 7A is a diagram showing an example of a standby screen.

A flow of the storage print processing will be described with reference to FIGS. 5 to 7C. When a user who transmitted a print job from the PC 18 to the multi-function peripheral 1 operates the home key 35B or the like of the multi-function peripheral 1, a standby screen 90 as shown in FIG. 7A is displayed on the display 34A of the touch panel 34. The standby screen 90 includes a fax button 51, a copy button 52, a scan button 53, a storage print button 54, a setting button 55, and a user authentication button 56.

The user authentication button 56 is used when a user logs in or logs out of the multi-function peripheral 1. When the user authentication button 56 is pressed, the CPU 12 starts the processing shown in FIG. 5. In step S300 of FIG. 5, the CPU 12 executes authentication processing. The CPU 12 displays a login screen on the display 34A of the touch panel 34, and receives input of the identification information of the user and a password using the physical key 35 or the like. When the user inputs his/her own identification information and the password, the CPU 12 collates with information stored in advance in an authentication DB 46 stored in the non-volatile memory 15. When the information input by the user matches the information stored in advance in the authentication DB 46, the user can log into the multi-function peripheral 1. When the user logs into the multi-function peripheral 1 (S301: YES), the CPU 12 proceeds to the processing of step S302.

In step S302, the CPU 12 determines whether a print job of the logged-in user is stored in the USB storage 19A. The CPU 12 searches print jobs stored in the job management information 41 of the USB storage 19A for a print job associated with the user identification information of the logged-in user. As a result of the search, when there is a print job associated with the user identification information of the logged-in user (S302: YES), the CPU 12 proceeds to the processing of step S303. In step S303, the CPU 12 performs the storage print processing. The storage print processing will be described later with reference to FIG. 6.

When the print job associated with the user identification information of the logged-in user is not present in the job management information 41 (S302: NO), or when the processing of step S303 is completed, the CPU 12 proceeds to the processing of step S304. In step S304, the CPU 12 displays the standby screen 90 on the display 34A of the touch panel 34, and proceeds to the processing of step S305.

In step S305, the CPU 12 determines whether the storage print button 54 is pressed. When the storage print button 54 is pressed (S305: YES), the CPU 12 proceeds to the processing of step S303, and when the storage print button 54 is not pressed (S305: NO), the CPU 12 proceeds to the processing of step S306.

In step S306, the CPU 12 determines whether the logged-in user logs out. When the user performs a predetermined operation and logs out from the multi-function peripheral 1 (S306: YES), the CPU 12 ends the processing of FIG. 5, and when the user does not perform the predetermined operation for logging out (S306: NO), the CPU 12 displays the standby screen 90 on the display 34A of the touch panel 34 (S304).

The storage print processing executed in step S303 of FIG. 5 will be described with reference to FIGS. 6, 7A, 7B, and 7C. When the processing shown in FIG. 6 is started, in step S400, the CPU 12 acquires information related to the print job of the logged-in user from the job management information 41, and creates a print job list. After creating the print job list, the CPU 12 proceeds to the processing of step S401.

Figure 7B:
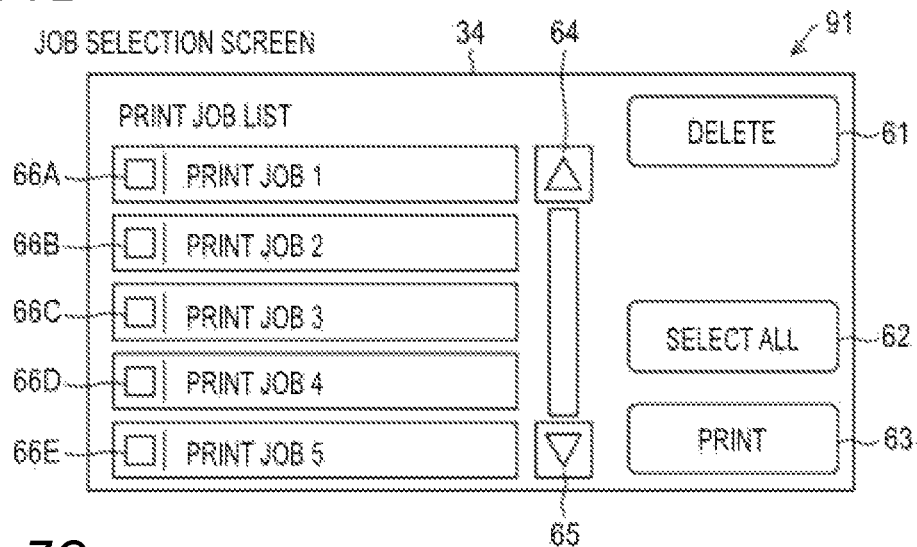
FIG. 7B is a diagram showing an example of a job selection screen.

In step S401, the CPU 12 executes print job display processing. The CPU 12 displays a job selection screen 91 shown in FIG. 7B on the display 34A of the touch panel 34. On the job selection screen 91, a delete button 61, a select-all button 62, a print button 63, check boxes 66A to 66E, and scroll buttons 64 and 65 are displayed. The job selection screen 91 shown in FIG. 7B is displayed when the user "User A" logs into the multi-function peripheral 1. The print job list created in step S400 is displayed on a left side of the job selection screen 91. All the job names of the print jobs of which the user identification information is "User A" in the job management information 41 of FIG. 4A are displayed in the print job list of FIG. 7B.

When the job selection screen 91 is displayed, the CPU 12 executes print job selection processing. The CPU 12 receives selection of a print job to be deleted or printed by the user via the user interface 34B of the touch panel 34 or the physical key 35. When the user selects and presses print jobs desired to be deleted or printed from among the print jobs displayed on the job selection screen 91, check marks are displayed in the check boxes 66A to 66E located to the left of the selected print jobs. When the user presses the select-all button 62, check marks are displayed in the check boxes 66A to 66E of all the print jobs displayed on the job selection screen 91. When the user presses the delete button 61 or the print button 63, the selection of the print job is confirmed.

In step S402, the CPU 12 determines whether there is an instruction input by the print button 63 or an instruction input by the delete button 61. The print button 63 is a button for instructing printing of the image data 42 for the print job selected by the user. The delete button 61 is a button for instructing deletion of a print job. When there is an instruction input by the print button 63 on the job selection screen 91 (S402: print button), the CPU 12 proceeds to the processing of step S403.

In step S403, the CPU 12 executes holding selection processing. More specifically, the CPU 12 displays a holding selection screen 92 shown in FIG. 7C on the display 34A of the touch panel 34. The holding selection screen 92 is a screen for allowing the user to select whether to hold the storage of a print job or delete the print job after completion of the printing of the print job selected by the user. A YES button 71 and a NO button 72 are displayed on the holding selection screen 92. The user presses the YES button 71 when desiring to hold the storage of the print job even after the completion of the printing, and presses the NO button 72 when desiring to delete the print job after the completion of the printing. When the user presses the YES button 71 or the NO button 72, the processing proceeds to step S404.

In step S404, the CPU 12 executes print processing. The CPU 12 controls the printing device 2 to print the image data 42 of the print job selected by the user on the job selection screen 91. When the printing of all the print jobs selected on the job selection screen 91 is completed, the CPU 12 proceeds to the processing of step S405.

In step S405, the CPU 12 determines whether the YES button 71 is selected on the holding selection screen 92. When the YES button 71 is selected (S405: YES), the CPU 12 proceeds to the processing of step S406. When the YES button 71 is not selected on the holding selection screen 92 (S405: NO), that is, when the NO button 72 is selected, the CPU 12 proceeds to the processing of step S407.

In step S406, the CPU 12 changes the holding flag of the job management information 41 to ON for the print job selected from the job selection screen 91, and stores the changed job management information 41 in the USB storage 19A. That is, the CPU 12 associates the print job selected from the job selection screen 91 with the holding flag, and stores the changed job management information 41 in the USB storage 19A. For example, when the "User A" selects a "print job 1" and a "print job 3", holding flags of the "print job 1" and the "print job 3" in the job management information 41 are changed to ON as shown in FIG. 4B. When the update of the job management information 41 is completed, the CPU 12 ends the processing of FIG. 6.

In step S407, the CPU 12 deletes the print job selected from the job selection screen 91 from the USB storage 19A. The CPU 12 deletes the image data 42 of the print job selected from the job selection screen 91 from the USB storage 19A, deletes information related to the print job from the job management information 41, and stores the deleted job management information 41 in the USB storage 19A. When the update of the job management information 41 is completed, the CPU 12 ends the processing of FIG. 6.

In step S402, when there is an instruction input by the delete button 61 (S402: delete button), the CPU 12 proceeds to the processing of step S408. In step S408, the CPU 12 deletes the image data 42 of the print job selected from the job selection screen 91 from the USB storage 19A, deletes information related to the print job from the job management information 41, and stores the deleted job management information 41 in the USB storage 19A.

Subsequently, in step S409, the CPU 12 determines whether the print job of the logged-in user remains in the job management information 41. That is, the CPU 12 determines whether there is a print job remaining to be displayed in the print job list. When the print job of the logged-in user remains in the job management information 41 (S409: YES), the CPU 12 proceeds to the processing of step S401, and when the print job of the logged-in user does not remain in the job management information 41 (S409: NO), the CPU 12 ends the processing of FIG. 6.

<Automatic Deletion Processing>

Figure 8:
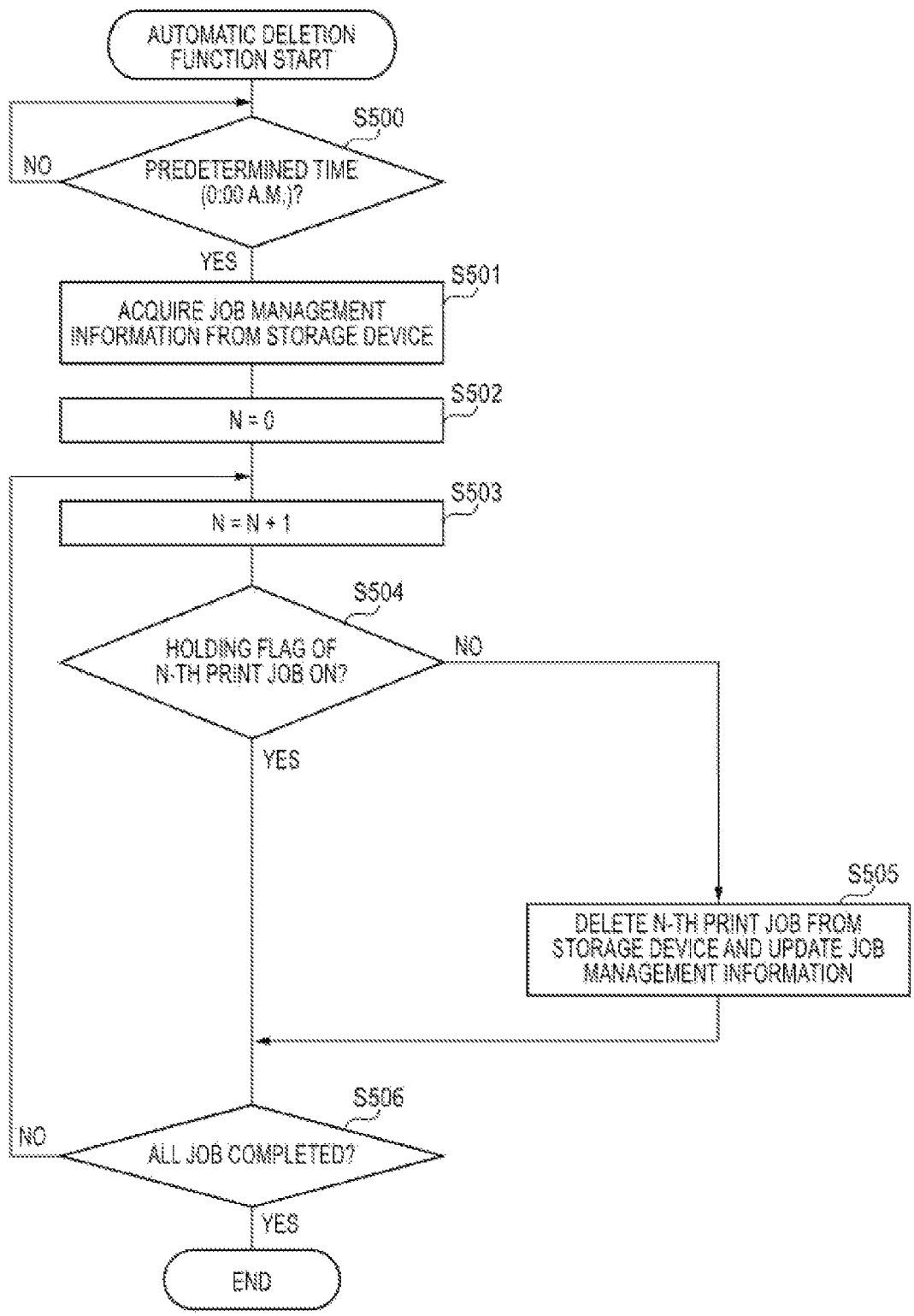
FIG. 8 is a flowchart showing a flow of automatic deletion processing in the printing apparatus according to the first embodiment of the present disclosure.

A flow of the automatic deletion processing will be described with reference to FIG. 8. FIG. 8 is a flowchart relating to the automatic deletion processing. The automatic deletion processing is resident when automatic deletion setting 44 stored in the non-volatile memory 15 is ON. In step S500, the CPU 12 determines whether a predetermined automatic deletion timing is reached. In an example of FIG. 8, the predetermined automatic deletion timing is 0:00 a.m. When the predetermined automatic deletion timing is reached (S500: YES), the CPU 12 proceeds to the processing of step S501. However, when the user logs into the multi-function peripheral 1 at the predetermined automatic deletion timing, the processing may not proceed to the processing of step S501, or may proceed to the processing of step S501 after the user logs out.

In step S501, the CPU 12 acquires the job management information 41 from the USB storage 19A.

Thereafter, the CPU 12 deletes the image data 42 of the print job of which the holding flag is OFF from the USB storage 19A while leaving the print job of which the holding flag is set to ON in the job management information 41, and deletes the print job of which the holding flag is OFF from the job management information 41 (S502 to S506).

In FIG. 8, the CPU 12 initializes a variable N to 0 in step S502, and increments the variable N by 1 in step S503. In step S504, the CPU 12 determines whether the holding flag of the N-th print job in the job management information 41 is ON. That is, the CPU 12 determines whether the holding flag is associated with the N-th print job. When the holding flag of the N-th print job is ON (S504: YES), the CPU 12 proceeds to the processing of step S506, and when the holding flag of the N-th print job is OFF (S504: NO), the CPU 12 proceeds to the processing of step S505. Here, N-th means an order in the job management information 41 at the time of starting the processing of step S502. In the following description, it is assumed that even if a part of the print jobs is deleted and the print jobs are repeated in the job management information 41, a processing order of the print jobs does not change.

In step S505, the CPU 12 deletes the image data 42 of the N-th print job from the USB storage 19A, and deletes the N-th print job from the job management information 41. The CPU 12 stores the job management information 41 after deleting the N-th print job in the USB storage 19A.

In step S506, the CPU 12 determines whether the storage of the print job is to be held or deleted for all the print jobs stored in the job management information 41. When the determination is completed for all the print jobs stored in the job management information 41 (S506: YES), the CPU 12 ends the processing of FIG. 8. When the processing is not completed for all the print jobs stored in the job management information 41 (S506: NO), the CPU 12 proceeds to the processing of step S503, increments the variable N by 1, and starts the processing of the next print job.

Operation and Effect of First Embodiment

According to the multi-function peripheral 1 according to the first embodiment described above, in the storage print processing, the CPU 12 causes the display 34A of the touch panel 34 to display the print jobs stored in the USB storage 19A as the job selection screen 91, and causes one or more print jobs to be selected among the print jobs displayed on the job selection screen 91 by an input operation received via the user interface 34B of the touch panel 34 (S401). Further, the CPU 12 displays the holding selection screen 92 for selecting whether to hold the storage of the print job selected from the job selection screen 91 in the USB storage 19A or delete the print job selected from the job selection screen 91 from the USB storage 19A after the completion of printing, and allows the storage of the print job to be selected by an input operation received via the user interface 34B (S403, S405). Further, the CPU 12 prints the image data 42 based on the print job selected from the job selection screen 91 on a sheet P using the printing device 2 (S404). Further, the CPU 12 holds the storage of the print job for which the YES button 71 is selected on the holding selection screen 92 (S406), and deletes, from the USB storage 19A, the print job for which the NO button 72 is selected on the holding selection screen 92 (S407). Further, the CPU 12 stores the print job for which the YES button 71 is selected on the holding selection screen 92 in the job management information 41 of the USB storage 19A in association with a holding flag. In the automatic deletion processing, when a holding flag is associated with the print job stored in the USB storage 19A at a predetermined automatic deletion timing (S500: YES) (S504: YES), the CPU 12 does not delete the print job from the USB storage 19A. When a holding flag is not associated with the print job stored in the USB storage 19A, the CPU 12 deletes the print job from the USB storage 19A (S504: NO, S505). According to the above configuration, when the user selects to hold the storage of the print job after the multi-function peripheral 1 prints the print job, the holding flag of "ON" is stored in association with the print job. At a timing of deleting a print job from the storage device, the print job stored in association with the holding flag of "ON" is not deleted from the storage device, whereby the print job for which storage is held after printing can be prevented from being automatically deleted by a function of automatically deleting a print job.

The automatic deletion timing is predetermined periodic time, and the CPU 12 determines whether a holding flag is associated with a print job stored in the USB storage 19A at the automatic deletion timing (S500: YES) (S504). According to the above configuration, a print job not associated with a holding flag is periodically deleted. Therefore, it is possible to prevent the storage capacity of the storage device such as the USB storage 19A from being constricted by an unnecessary print job.

The CPU 12 receives a print job from the PC 18 via the network I/F 16 (S200), stores the received print job in the USB storage 19A (S203), displays a job selection screen 91 including a print job list, which is a list of print jobs stored in the USB storage 19A, on the display 34A of the touch panel 34, and selects one or more print jobs among the print job list by the user performing an input operation on the user interface 34B (S401). According to the above configuration, the multi-function peripheral 1 receives a print job from the PC 18 and stores the print job in the USB storage 19A. Then, the list of print jobs stored in the USB storage 19A is displayed on the display 34A of the touch panel 34 of the multi-function peripheral 1. At the time of printing a print job, the list of print jobs stored in the USB storage 19A is presented to the user, whereby the user can confirm the storage status of the print job in the USB storage 19A.

The CPU 12 displays the job selection screen 91 on the display 34A of the touch panel 34 in step S401, and displays the holding selection screen 92 on the display 34A of the touch panel 34 in step S403 after allowing the user to select a print job and before printing the image data 42 of the print job selected in step S404. According to the above configuration, the holding selection processing is executed after the print job is selected and before the print processing is executed. Therefore, it is possible to allow the user to confirm whether to hold the print job in the storage device.

User identification information is stored, in association with a print job, in the job management information 41 stored in the USB storage 19A, the CPU 12 receives an input operation of logging into the multi-function peripheral 1 via the user interface 34B of the touch panel 34, performs user authentication based on the user identification information input by the input operation (S300 to S301), and displays, in the print job list, the print job stored in association with the user identification information of the logged-in user among the print jobs stored in the USB storage 19A when the job selection screen 91 is displayed on the display 34A of the touch panel 34. According to the above configuration, only the print job of the logged-in user is displayed on the job selection screen 91. Therefore, the user can confirm only the print job stored by the user among the print jobs stored in the USB storage 19A.

Second Embodiment

Other embodiments of the present disclosure will be described below. For convenience of description, members having the same functions as those described in the above embodiment are denoted by the same reference numerals, and description thereof will not be repeated.

Figure 9:
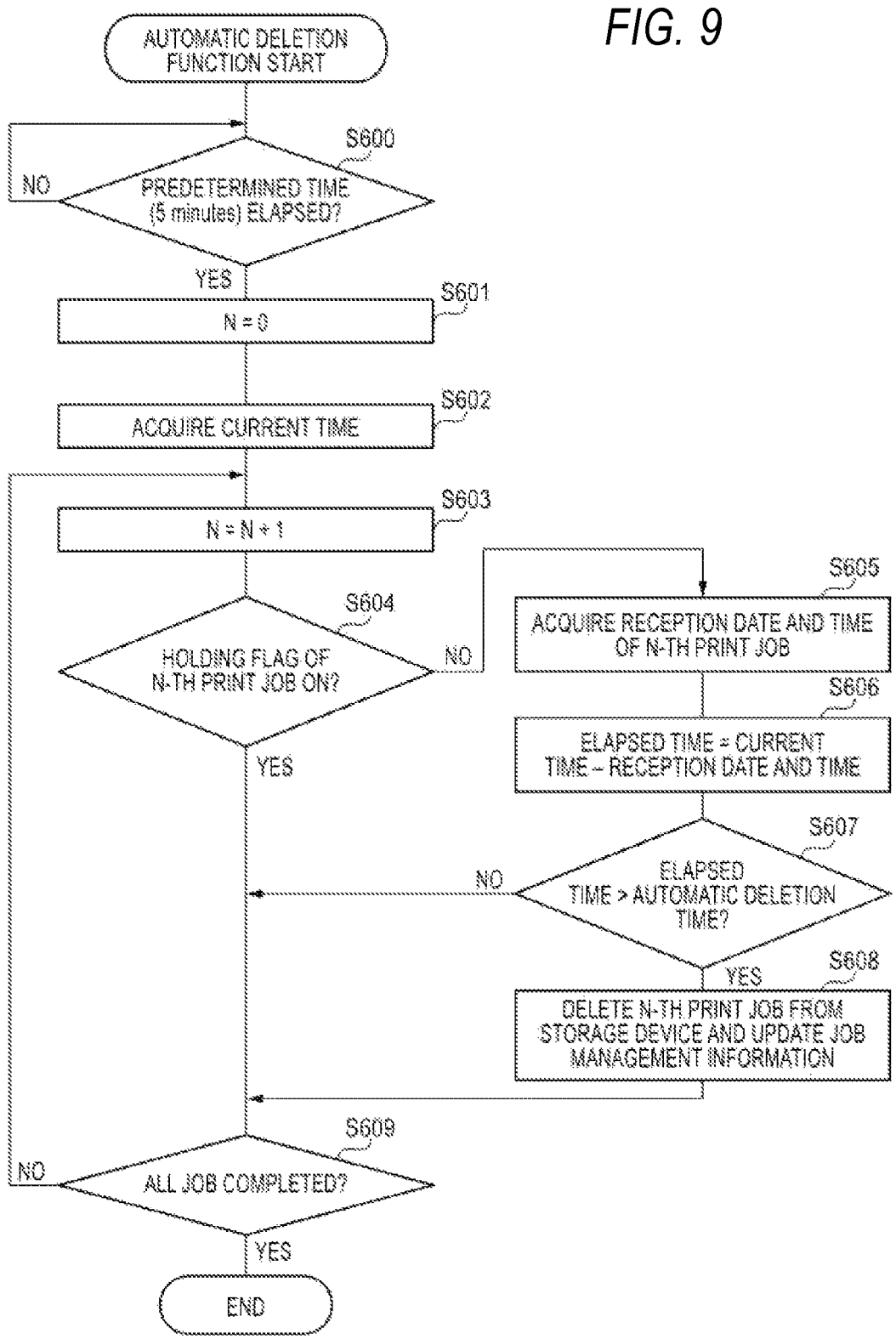
FIG. 9 is a flowchart showing a flow of automatic deletion processing in a printing apparatus according to a second embodiment of the present disclosure.

FIG. 9 is a flowchart related to automatic deletion processing in a second embodiment of the present disclosure. In step S600, the CPU 12 determines whether a predetermined automatic deletion timing is reached. In the example of FIG. 9, the automatic deletion timing is reached every five minutes. When the predetermined automatic deletion timing is reached (S600: YES), the CPU 12 proceeds to the processing of step S601. When a user logged into the multi-function peripheral 1 at the predetermined automatic deletion timing, the processing may not proceed to the processing of step S601.

In step S601, the CPU 12 initializes the variable N to 0. In step S602, the CPU 12 acquires current time. In step S603, the CPU 12 increments the variable N by 1. In step S604, the CPU 12 determines whether a holding flag of the N-th print job in the job management information 41 is ON. That is, the CPU 12 determines whether the holding flag is associated with the N-th print job. When the holding flag of the N-th print job is ON (S604: YES), the CPU 12 proceeds to the processing of step S609, and when the holding flag of the N-th print job is OFF (S604: NO), the CPU 12 proceeds to the processing of step S605.

In step S605, the CPU 12 acquires reception date and time associated with the N-th print job from the job management information 41. In step S606, the CPU 12 calculates a difference between the current time acquired in step S602 and the reception date and time acquired in step S605, and calculates elapsed time from the reception of the N-th print job.

In step S607, the CPU 12 determines whether the elapsed time calculated in step S606 is longer than predetermined automatic deletion time. The predetermined automatic deletion time is, for example, 24 hours. When the elapsed time from the reception of the N-th print job is longer than the predetermined automatic deletion time (S607: YES), the CPU 12 proceeds to the processing of step S608, and when the elapsed time from the reception of the N-th print job is equal to or shorter than the predetermined automatic deletion time (S607: NO), the CPU 12 proceeds to the processing of step S609.

In step S608, the CPU 12 deletes the N-th print job from the USB storage 19A. The CPU 12 deletes the image data 42 of the N-th print job from the USB storage 19A, and deletes the print job from the job management information 41.

In step S609, the CPU 12 determines whether the storage of the print job is held or deleted for all the print jobs stored in the job management information 41. When the determination is completed for all the print jobs stored in the job management information 41 (S609: YES), the CPU 12 ends the processing of FIG. 9. When the processing is not completed for all the print jobs stored in the job management information 41 (S609: NO), the CPU 12 proceeds to the processing of step S603, increments the variable N by 1, and starts the processing of the next print job.

Operation and Effect of Second Embodiment

According to the multi-function peripheral according to the second embodiment described above, the CPU 12 determines whether a holding flag is associated with a print job stored in the USB storage 19A every time predetermined time elapses (S604), a print job determined to be associated with a holding flag is not deleted from the storage device, and when it is determined that a holding flag is not associated and the automatic deletion time elapses from the date and time stored in the USB storage 19A, the print job is deleted from the USB storage 19A (S607: YES, S608). According to the above configuration, a print job not associated with a holding flag is deleted based on the elapsed time from the date and time when the print job is stored in the USB storage 19A. There is a high probability that a print job stored in the past is more unnecessary than a newly stored print job. Therefore, when the automatic deletion time elapses, the usage of the storage capacity of the storage device can be effectively reduced.

Third Embodiment

Other embodiments of the present disclosure will be described below. For convenience of description, members having the same functions as those described in the above embodiment are denoted by the same reference numerals, and description thereof will not be repeated.

Figure 10:
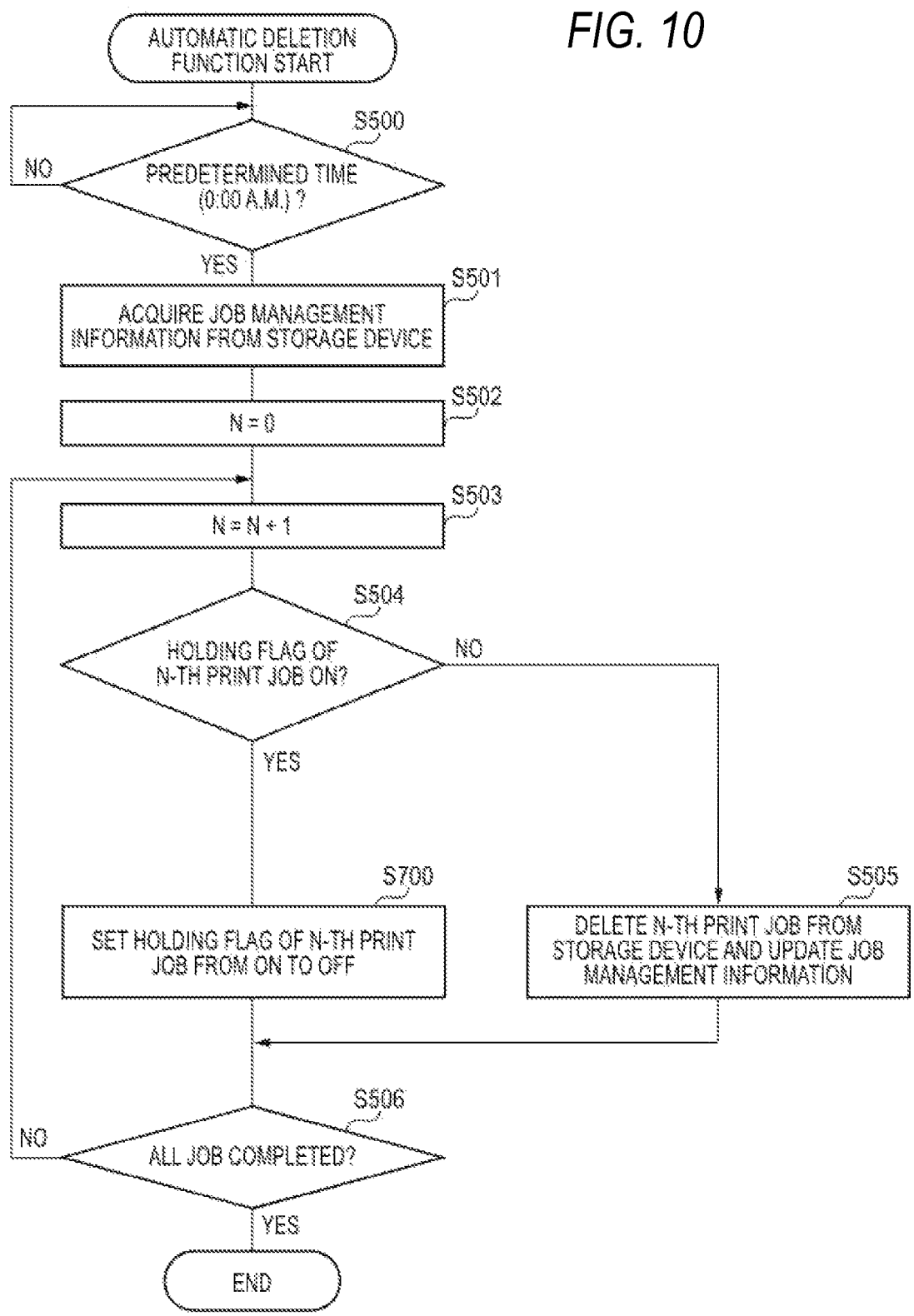
FIG. 10 is a flowchart showing a flow of automatic deletion processing in a printing apparatus according to a third embodiment of the present disclosure.

FIG. 10 is a flowchart related to automatic deletion processing in a third embodiment of the present disclosure. The automatic deletion processing according to the third embodiment is different from that according to the first embodiment in the processing performed when it is determined in step S504 that a holding flag of the N-th print job is ON. In the third embodiment, when it is determined in step S504 that the holding flag of the N-th print job is ON (S504 of FIG. 10: YES), the CPU 12 proceeds to the processing of step S700.

In step S700, the CPU 12 changes the holding flag of the N-th print job from ON to OFF. That is, the CPU 12 deletes the holding flag associated with the N-th print job.

Operation and Effect of Third Embodiment

According to the multi-function peripheral according to the third embodiment described above, when it is determined that a print job is stored in the USB storage 19A in association with a holding flag (S504 of FIG. 10: YES) at the automatic deletion timing (S500 of FIG. 10), the CPU 12 deletes the holding flag associated with the print job (S700).

According to the above configuration, when a print job stored in the USB storage 19A is periodically deleted, for a print job associated with a holding flag, the holding flag associated with the print job is deleted without deleting the print job. Therefore, it is possible to delete a print job that has not been printed for a long period of time by the user, and it is possible to prevent the storage capacity of the USB storage 19A from being constricted by an unnecessary print job. Since if a holding flag is associated by the user before the next automatic deletion timing, the print job is not deleted, the user can continue to store the desired print job.

Modified Examples

Figure 7C:
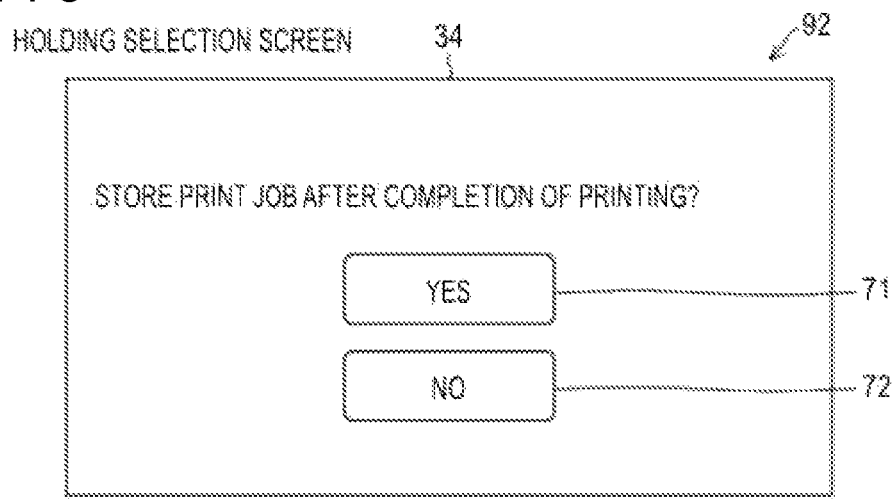
FIG. 7C is a diagram showing an example of a holding selection screen.

In the printing apparatus according to each of the above-described embodiments, the holding selection screen 92 is displayed on the display 34A of the touch panel 34 after the selection of the print job to be printed is performed on the job selection screen 91, but the present disclosure is not limited thereto. For example, a button for selecting whether to hold or delete the storage of the print job after printing may be further provided on the job selection screen 91. In the printing apparatus according to each of the above-described embodiments, the holding selection screen 92 is displayed before the printing of the print job, but the holding selection screen 92 may be displayed after the printing. The standby screen 90, the job selection screen 91, and the holding selection screen 92 shown in FIGS. 7A to 7C are merely examples, and are not limited thereto.

In the printing apparatus according to each of the above-described embodiments, data structure of the job management information 41 is shown in FIGS. 4A and 4B, but the present disclosure is not limited thereto. The data structure of the job management information 41 may be other than those shown in FIGS. 4A and 4B as long as information for specifying a print job, information for identifying a user who stores a print job, and information indicating whether to hold the storage after printing are included.

The present disclosure is not limited to the above embodiments, various changes are possible within the scope of claims, and embodiments obtained by combining technical means disclosed in the different embodiments as appropriate are also included in the technical scope of the present disclosure.

What is claimed is:

1. Printing apparatus comprising:
a user interface configured to receive a user's input operation;
a display;
a printing device configured to print an image on a sheet;
a storage device configured to store a print job; and
a controller, wherein
the controller is configured to execute
print job display processing of displaying print jobs stored in the storage device on the display,
print job selection processing of selecting one or more print jobs among the print jobs displayed by the print job display processing by the input operation received via the user interface,
holding selection processing of displaying a selection screen for selecting whether storage of the print job selected by the print job selection processing is to be held in the storage device or deleted from the storage device after completion of printing, and allowing holding or deletion of the storage of the print job to be selected by the input operation received via the user interface,
print processing of printing an image based on the print job selected by the print job selection processing on a sheet using the printing device,
hold processing of holding the storage of the print job for which the print processing is completed in the storage device when holding of the storage of the print job is selected by the holding selection processing, and
deletion processing of deleting the storage of the print job for which the print processing is completed from the storage device when deletion of the storage of the print job is selected by the holding selection processing,
the print job for which holding of the storage of the print job is selected by the holding selection processing is stored in the storage device in association with a holding flag,
when the holding flag is associated with the print job stored in the storage device, the print job is not deleted from the storage device at a predetermined automatic deletion timing, and
when the holding flag is not associated with the print job stored in the storage device, the print job is deleted from the storage device at the predetermined automatic deletion timing.

2. The printing apparatus according to claim 1, wherein the predetermined automatic deletion timing is predetermined periodic time, and
the controller is configured to determine whether the holding flag is associated with a print job stored in the storage device at the automatic deletion timing.

3. The printing apparatus according to claim 2, wherein when it is determined that the print job is stored in the storage device in association with the holding flag, the controller is configured to delete the holding flag associated with the print job at the predetermined automatic deletion timing.

4. The printing apparatus according to claim 1, wherein the controller is configured to
determine whether the holding flag is associated with the print job stored in the storage device every time predetermined time elapses,
not delete the print job determined to be associated with the holding flag from the storage device, and
delete the print job from the storage device when it is determined that the holding flag is not associated and an automatic deletion time elapses from date and time stored in the storage device.

5. The printing apparatus according to claim 1, further comprising:
a communication device configured to communicate with an external device, wherein
the controller is configured to
receive a print job from the external device via the communication device and store the received print job in the storage device,
display, on the display, a job selection screen including a print job list which is a list of the print jobs stored in the storage device in the print job display processing, and
select the one or more print jobs from the print job list by the user's input operation on the user interface in the print job selection processing.

6. The printing apparatus according to claim 1, wherein the controller is configured to execute the holding selection processing after the print job selection processing is executed and before the print processing is executed.

7. The printing apparatus according to claim 1, wherein user identification information related to a user who stores a print job is stored in the storage device in association with the print job, and the controller is configured to further execute authentication processing of receiving an input operation of logging into the printing apparatus via the user interface and performing user authentication based on the user identification information input by the input operation, and display, on the display, a print job stored in association with the user identification information of the user authenticated by the authentication processing among the print jobs stored in the storage device in the print job display processing.

\* \* \* \* \*